9/29/87 XR 4,697,195

United States Patent [19]

Quate et al.

[11] Patent Number: 4,697,195

[45] Date of Patent: Sep. 29, 1987

[54] NOZZLELESS LIQUID DROPLET EJECTORS

[75] Inventors: Calvin F. Quate, Stanford, Conn.; Butrus T. Khuri-Yakub, Palo Alto, Calif.

[73] Assignee: Xerox Corporation, Stanford, Conn.

[21] Appl. No.: 946,682

[22] Filed: Jan. 5, 1987

Related U.S. Application Data

[63] Continuation of Ser. No. 776,291, Sep. 16, 1985, abandoned.

[51] Int. Cl.[4] .......... G01D 15/16

[52] U.S. Cl. .......... 346/140 R; 310/334; 310/366; 310/800

[58] Field of Search .......... 346/140, 75; 310/366, 310/334, 337, 800

[56] References Cited

U.S. PATENT DOCUMENTS

| | | | |
|---|---|---|---|
| 3,211,088 | 10/1965 | Naiman | 101/114 |
| 3,916,419 | 10/1975 | Fan | 346/140 X |
| 4,166,277 | 8/1979 | Clelo et al. | 346/140 |
| 4,173,009 | 10/1979 | Toda | 310/334 X |
| 4,296,417 | 10/1981 | Markham | 310/800 X |
| 4,308,547 | 12/1981 | Lovelady et al. | 346/140 |
| 4,509,058 | 4/1985 | Fischbeck | 346/1.1 |

OTHER PUBLICATIONS

T. Kikuchi et al., Ultrasonic Imaging System Using Interdigital Transducer, 1982, IEEE, pp. 613-622.
Karl Söllner, The Mechanism of the Formation of Fogs by Ultrasonic Waves, Jul., 1936, 1532-1536.
R. Wood, The Physical and Biological Effects of High--Frequency Soundwaves of Great Intensity, Phil. Mag. S. 7., vol. 4, No. 22, Sep. 1927.

*Primary Examiner*—Joseph W. Hartary

[57] ABSTRACT

A nozzleless print head for ink jet printing and the like comprises one or more essentially planar surface acoustic wave transducers which are submerged at a predetermined depth in a liquid filled reservoir, so that each of the transducers launches a converging cone of coherent acoustic waves into the reservoir, thereby producing an acoustic beam which comes to a focus at or near the surface of the reservoir (i.e., the liquid/air interface). The acoustic beam may be intensity modulated to control the ejection timing, or an external source may be used to extract droplets from the acoustically excited liquid on the surface of the reservoir on demand. Regardless of the timing mechanism employed, the size of the ejected droplets is determined by the waist diameter of the focused acoustic beam. To control, the direction in which the droplets are ejected, provision may be made for producing a controllable acoustical asymmetry for steering the focused acoustic beam in a direction generally parallel to the surface of the reservoir.

19 Claims, 6 Drawing Figures

NOZZLELESS LIQUID DROPLET EJECTORS

This is a continuation of application Ser. No. 776,291, filed Sept. 16, 1985 now abandoned.

FIELD OF THE INVENTION

This invention relates to leaky Rayleigh wave focused acoustic generators for ejecting liquid droplets from liquid filled reserviors and, more particularly, to relatively reliable print heads for ink jet printers and the like.

BACKGROUND OF THE INVENTION

Substantial effort and expense have been devoted to the development of ink jet printers, especially during the past couple of decades. As is known, ink jet printing has the inherent advantage of being a plain paper compatible, direct marking technology, but the printers which have been developed to capitalize on that advantage have had limited commercial success. Although the reasons for the disappointing commercial performance of these printers are not completely understood, it is apparent that the persistent problems which have impeded the development of low cost, reliable print heads for them have been a contributing factor. Print heads have been provided for low speed ink jet printers, but they have not been fully satisfactory from a cost or a reliability point of view. Moreover, higher speed ink jet printing has not been practical due to the performance limitations of the available print heads.

"Continuous stream" and "drop on demand" print heads have been developed for ink jet printers. There are functional and structural differences which distinguish those two basic print head types from one another, but print heads of both types customarily include nozzles which have small ejection orifices for defining the size of the liquid ink droplets emitted thereby. They, therefore, suffer from many of the same drawbacks, including unscheduled maintenance requirements because of clogged nozzles and a fundamental cost barrier due to the expense of manufacturing the nozzles.

Others have proposed nozzleless print heads for ink jet printing. For example, Lovelady et al. U.S. Pat. No. 4,308,547, which issued Dec. 24, 1981 on a "Liquid Drop Emitter," pertains to acoustic print heads for such printers. This patent is especially noteworthy because one of its embodiments relates to a print head in which a hemispherically shaped piezoelectric transducer is submerged in a reservior or pool of liquid ink for launching acoustic energy into the reservior and for bringing that energy to focus at or near the surface of the reservior, so that individual droplets of ink are propelled therefrom. As will be seen, the patent also proposes an alternative embodiment which utilizes a planar piezoelectric crystal for generating the acoustic energy, a conical or wedged shaped horn for bringing the acoustic energy to focus, and a moving belt or web for transporting the ink into position to be propelled by the focused acoustic energy. However, the additional complexity of this alternative proposal is contrary to the principal purpose of the present invention.

A substantial body of prior art is available on the subject of acoustic liquid droplet ejectors in general. Some of the earliest work in the field related to fog generators. See Wood, R. W. and Loomis, A. L., "The Physical and Biological Effects of High Frequency Sound-Waves of Great Intensity," *Phil. Mag.*, Ser. 7, Vol. 4, No. 22, September 1927, pp. 417–436 and Sollnar, K., "The Mechanism of the Formation of Fogs by Ultrasonic Waves," *Trans. Faraday Soc.*, Vol. 32, 1936, pp. 1532–1536. Now, however, the physics of such ejectors are sufficiently well understood to configure them for ink jet printing and other applications where it is necessary to control both the timing of the droplet ejection and the size of the droplets that are ejected. Indeed, an inexpensive, reliable, readily manufacturable liquid droplet ejector providing such control is clearly needed for nozzleless ink jet printing and the like.

SUMMARY OF THE INVENTION

In response to the above-identified need, the present invention provides a nozzleless droplet ejector comprising a surface acoustic wave transducer which is submerged at a predetermined depth in a liquid filled reservior for launching a converging cone of coherent acoustic into the reservior, thereby producing an acoustic beam which comes to a focus at or near the surface of the reservior (i.e., the liquid/air interface). The acoustic beam may be intensity modulated or focused/-defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam.

To carry out this invention, the transducer has a pair of multi-element, ring-shaped electrodes which are concentrically deposited in interdigitated relationship on the upper surface of an essentially planar piezoelectric substrate, whereby radially propogating, coherent Rayleigh waves are piezoelectrically generated on that surface (the "active surface" of the transducer) when an ac. power supply is coupled across the electrodes. Due to the incompressability of the liquid and the relatively low velocity of sound through it, these surface acoustic waves cause a generally circular pattern of coherent longitudinal acoustic to leak into the reservior at a predetermined acute angle with respect to the active surface of the transducer, thereby producing the focused acoustic beam. Electrically independent interdigitated outrigger electrodes may be deposited on the transducer substrate radially outwardly from the ring-shaped electrodes to allow for acoustic steering of the focused acoustic beam in a plane parallel to the surface of the reservior. For example, two orthogonal sets of outrigger electrodes may be provided to perform the acoustic steering required for matrix printing and the like. Alternatively, a beam steering capability may be built into the transducer by circumferentially segmenting its interdigitated ring-shaped electrodes, thereby permitting them to be differentially excited.

In view of the planar geometry of the transducer, standard fabrication processes, such as photolithography, may be employed to manufacture precisely aligned, integrated linear and areal arrays of such transducers, so inexpensive and reliable multiple droplet ejector arrays can be produced.

BRIEF DESCRIPTION OF THE DRAWINGS

Other objects and advantages of this invention will become apparent when the following detailed description is read in conjunction with the attached drawings, in which:

FIG. 3 is a plan view of a linear array of surface acoustic wave transducers which have orthogonal steering electrodes for performing matrix printing and the like;

DETAILED DESCRIPTION OF THE ILLUSTRATED EMBODIMENTS

While the invention is described in some detail hereinbelow with reference to certain illustrated embodiment, it is to be understood that there is no intent to limit it to those embodiments. On the contrary, the aim is to cover all modifications, alternatives and equivalents falling within the spirit and scope of the invention as defined by the appended claims.

Figure 1:
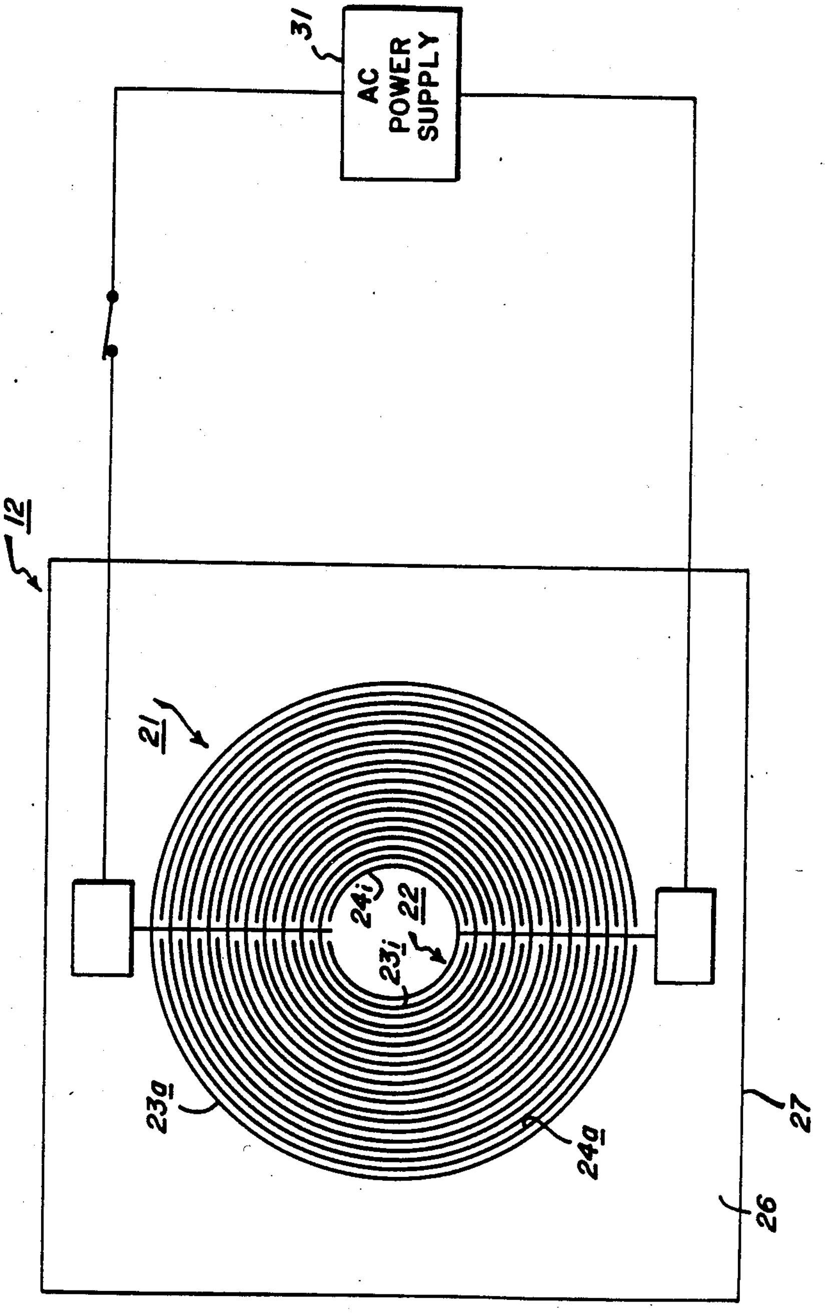
FIG. 1 is a sectional elevational view of a liquid droplet ejector constructed in accordance with the present invention.
Figure 2:
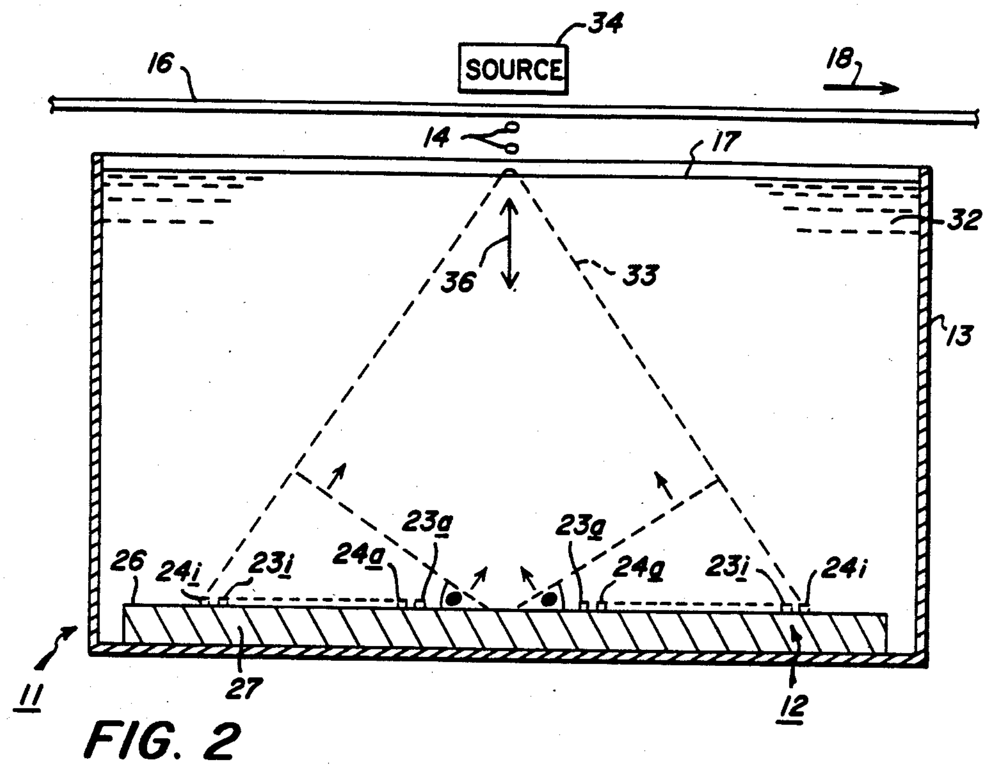
FIG. 2 is a plan view of a surface acoustic wave transducer for the ejector shown in FIG. 1.

Turning now to the drawings, and at this point especially to FIGS. 1 and 2, there is a nozzleless droplet ejector 11 comprising a surface acoustic wave transducer 12 which is submerged at a predetermined depth in a liquid filled reservior 13 for ejecting individual droplets of liquid 14 therefrom on demand. Provision (not shown) may be made for replenishing the liquid level of the reservior 13 during operation to ensure that the submersion depth of the transducer 12 remains essentially constant.

For ink jet printing, the ejector 11 emits a time sequenced series of liquid ink droplets 14 from the reservior 13 to print an image on a suitable recording medium 16, such as plain paper. The recording medium 16 is located a short distance above the liquid/air interface (i.e., the surface) 17 of the reservior 13, so the velocity at which the droplets 14 are ejected from the reservior 13 is selected to cause them to traverse that air gap with substantial directional stability. In practice, baffles (not shown) may be provided for suppressing at least some of the ambient air currents which might otherwise cause unwanted deflection of the droplets 14.

The recording medium 16 typically is advanced in a cross-line direction, as indicated by the arrow 18, while an image is being printed. The ejector 11, on the other hand, may be mounted on a carriage (not shown) for reciprocating movement in an orthogonal direction parallel to the plane of the recording medium 16, thereby permitting the image to be printed in accordance with a raster scanning pattern. Alternatively, a line length, linear array of ejectors 11 (see FIG. 3) may be provided for printing the image on a line-by-line basis. Such an array may be shifted (by the means not shown) back and forth in the orthogonal direction while the image is being printed to more completely fill the spaces between the ejectors 11, without having to reduce their center-to-center spacing. See K. A. Fishbeck's commonly assigned U.S. Pat. No. 4,509,058, which issued Apr. 2, 1985 on "Ink Jet Printing Using Horizontal Interlace." Areal ejector arrays (not shown) also may be constructed in accordance with this invention, but an areal array having the large number of ejectors 11 which would be required for printing a standard page size image at an acceptable resolution without any relative movement of the recording medium 16 is likely to be too expensive for most applications.

In keeping with the present invention, the transducer 12 comprises a pair of ring-shaped electrodes 21 and 22, each of which is radially patterned to have a plurality of electrically interconnected, ring-like elements *23a–23i* and *24a–24i*, respectively. As will be seen, the electrode elements *23a–23i* and *24a–24i* are concentrically deposited in interdigitated relationship on a generally planar surface 26 of a piezoelectric substrate 27. Furthermore, in the illustrated embodiment, the electrode elements *23a–23i* and *24a–24i* are of essentially uniform width and have a fixed radial pitch, but it is to be understood that their width and/or pitch may be varied without departing from this invention. For example, the width of the electrodes elements *23a–23i* and *24a–24i* may be varied radially of the transducer 12 to acoustically apodize it. Likewise, the pitch of the electrodes elements *23a–23i* and *24a–24i* may be varied radially of the transducer 12 to permit its acoustic focal length to be increased or decreased under electrical control. The substrate 27 may be a piezoelectric crystal, such as $LiNbO_3$, or a piezoelectric polymer, such as $PVF_2$. Indeed, it will be apparent to persons of ordinary skill in the art that the substrate 27 may be a composite composed of a piezoelectric film, such as $ZnO_2$, deposited upon a passive insulating support, such a glass. It is important to note, however, that its electrode bearing or "active" surface 26 is planar because that facilitates the use of standard metallization patterning processes, such as photolithography, for fabricating the electrodes 21 and 22. As will be understood, the relatively simple and straightforward construction of the transducer 12 is a significant advantage, especially for the cost effective production of the linear and areal transducer arrays which may be needed for applications requiring precisely aligned arrays of droplet ejectors 11.

In operation, the transducer 12 is oriented with its active surface 26 facing and in generally parallel alignment with the surface 17 of the reservior 13. Furthermore, an ac. power supply 31 having a predetermined, output frequency of between approximately 1 MHz, and 500 MHz, is coupled across its electrodes 21 and 22, whereby its piezoelectric substrate 27 is excited to generate a Rayleigh-type acoustic wave which travels along the surface 26. Due to the ring-like shape of the electrodes 21 and 22, the Rayleigh wave has a pair of nearly circular, opposed wavefronts which propogate radially inwardly and outwardly, respectively, with respect to the electrodes 21 and 22. The outwardly propogating or expanding wavefront is gradually attenuated as it expands away from the electrodes 21 and 22, but the inwardly propogating or contracting wavefront creates a constructive interference centrally of the electrodes 21 and 22. The output frequency of the power supply 31 is matched with the radial pitch (or one of the radial pitches) of the interdigitated electrode elements *23a–23i* and *24a–24i* to efficiently transform the electrical energy into acoustic energy.

Coherent acoustic waves are induced into the incompressible liquid 32 within the reservior 13 in response to the Rayleigh waves generated by the transducer 12. More particularly, a converging cone of longitudinal acoustic waves are launched into the liquid 32 in response to the contracting wavefront of surface acoustic waves, and a diverging, doughnut-like cone of longitudinal acoustic waves are launched into the liquid 32 in response to the expanding wavefront of surface acoustic waves. As will be seen, the converging cone of induced or acoustic waves form an acoustic beam 33 for ejecting the droplets 14 from the reservior 13 on demand. The diverging acoustic waves, on the other hand, can be ignored because they are suppressed, such as by sizing or otherwise constructing the reservior 13 to prevent any significant reflection of them.

In accordance with the present invention, provision is made for bringing the acoustic beam 33 to a generally spherical focus approximately at the surface 17 of the reservior 13. The speed ($S_p$) at which sound travels through the piezoelectric substrate 27 of the transducer 12 characteristically is much greater than the speed ($S_1$) at which it travels through the liquid 32. Thus, the generally circular wavefront of the converging leaky Rayleigh waves propogates into the liquid 32 at an acute angle $\theta$, with respect to the surface 26 of the transducer substrate 27, where $$\theta=\sin^{-1}(S_1/S_p) \quad (1)$$

Accordingly, the depth at which the transducer 12 should be submerged in the reservior 13 to cause the acoustic beam 33 to come to a focus at the surface 17 of the reservior 13, using the outermost electrode of the transducer 12 as a reference, is less than or equal to by:

$$D=d/2\tan[\sin^{-1}(S_i/S_p)] \quad (2)$$

where:

D=the submersion depth of the transducer 12 as measured to its electrode bearing surface 26; and d=the outside diameter of the electrodes 21, 22.

Equation (2) assumes a diffraction limited focus of the acoustic beam 33, such that the wavelength λ, of the transducer generated Rayleigh waves determines the waist diameter of the acoustic beam 33 at focus. As will be understood:

$$\lambda=S_p/f \quad (3)$$

where:

f=the output frequency of the power supply 31.

The surface tension and the mass density of the liquid 32 determine the minimum threshold energy level for ejecting droplets 14 from the reservior 13. Moreover, additional energy is required to eject the droplets 14 at the desired ejection velocity. To meet these energy requirements, suitable provision may be made for controlling the ac. power supply 31 so that it intensity modulates the acoustic beam 33 to acoustically propel the droplets 14 from the reservior 13 on demand. Alternatively, as indicated by the arrow 36, provision may be made for selectively focusing and defocusing the acoustic beam 33 on the surface 17 of the reservior 13,, such as by mechanically moving the transducer 12 up and down in the reservior 13 or by modulating the frequency at which it is being driven. Still another option is to provide an external source 34 for controlling the ejection timing of the droplets 14.

For external timing control, the intensity of the acoustic beam 33 advantageously is selected to acoustically excite the liquid 32 within the beam waist to a sub-threshold, incipient droplet formation energy state (i.e., an energy level just slightly below the threshold level for forming a droplet 14 at room temperature), whereby the external source 34 need only supply a small amount of supplemental energy to cause the ejection of the droplet 14. As will be appreciated, the supplemental energy supplied by the external source 34 may in any suitable form, such as thermal energy for heating the acoustically excited liquid 32 to reduce its surface tension, or electrostatic or magnetic energy for attracting an acoustically excited, electrostatically charged or a magnetically responsive, respectively, liquid 32. Regardless of the technique employed to control the ejection timing, the size of the ejected droplets 14 is primarily determined by the waist diameter of the acoustic beam 33 as measured at the surface 17 of the reservior 13.

Figure 4:
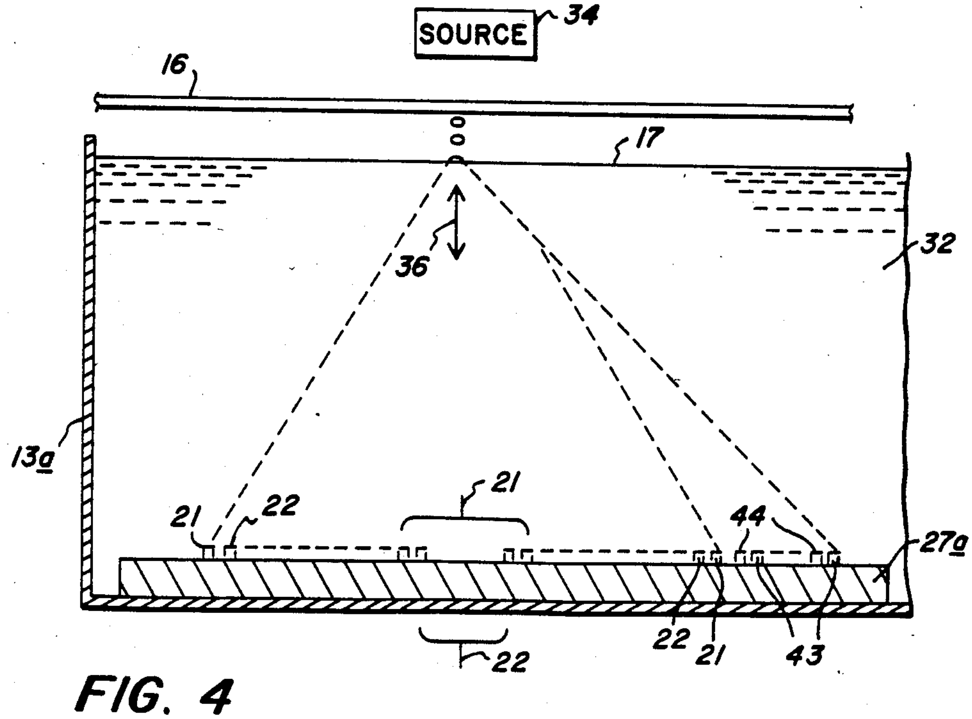
FIG. 4 is a sectional elevational view taken along the line 4—4 in FIG. 3 to illustrate the beam steering mechanism in further detail.
Figure 3:
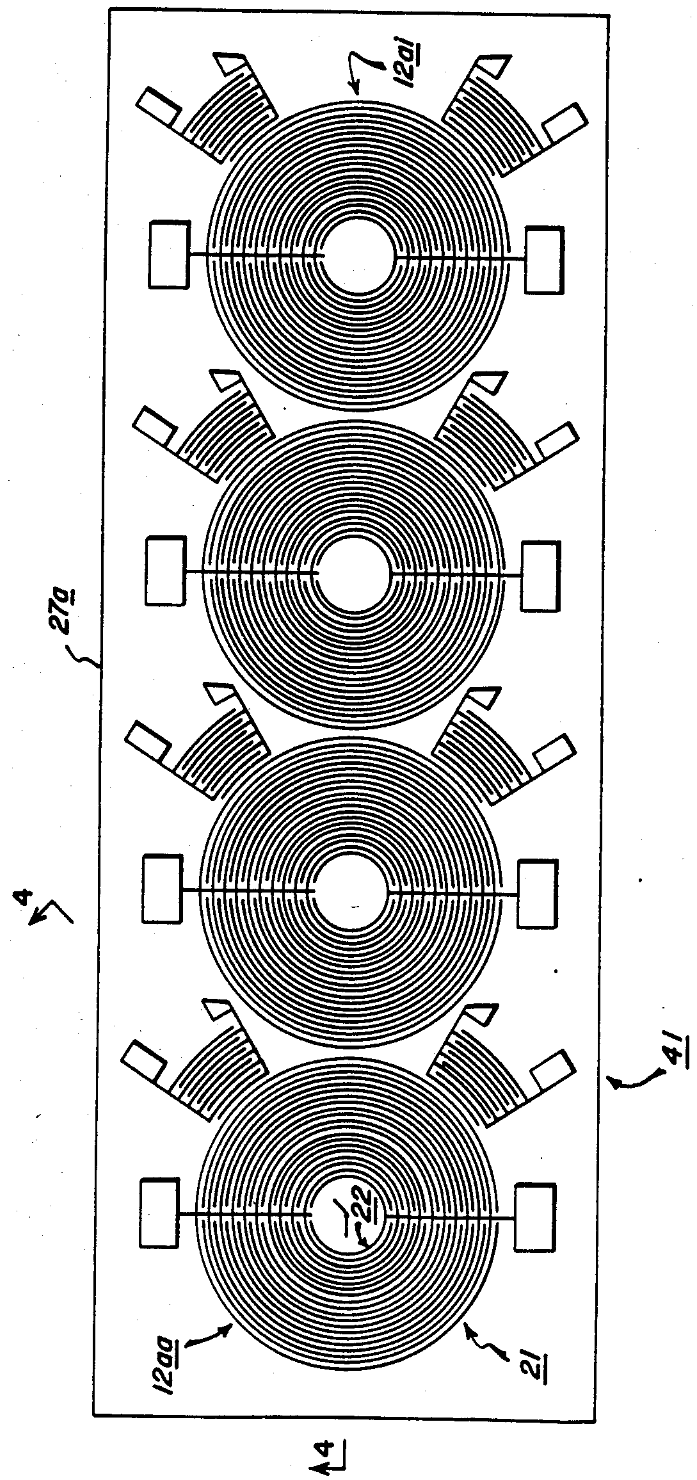

Referring to FIGS. 3 and 4, there is an array 41 of surface acoustic wave transducers **12*aa*–12*ai* to form an array of droplet ejectors 11*a* (only one of which can be seen in FIG. 4). As shown, the transducers 12*aa*–12*ai* are linearly aligned on uniformally separated centers, so they are suitably configured to enable the droplet ejectors 11*a* to function as a multi-element print head for ink jet line printing. Preferably, the transducer 12*aa*–12*ai* are integrated on and share a single or common piezoelectric substrate 27*a*, thereby permitting the alignment of the transducers 12*aa*–12*ai*** to be performed while they are being manufactured.

The transducers **12*aa*–12*ai* are identical to each other and are similar in construction and operation to the above-described transducer 12, except that the transducers 12*aa*–12*ai* further include provision for acoustically steering their focused acoustic beams 33*a*. As a result of the beam steering capability of the transducers 12*aa*–12*ai*, the droplet ejectors 11*a* have greater flexibility than the ejector 11 (for instance, the ejectors 11*a* maybe used for dot matrix ink jet printing or they may perform solid line printing without the need for any mechanical motion of the transducers 12*aa*–12*ai*), but they otherwise are related closely to the ejector 11**. Therefore, to avoid unnecessary repitition, like parts are identified by like reference numerals using a convention, whereby the addition of a single or double letter suffix to a reference numeral used hereinabove identifies a modified part shown once or more than once, respectively. Unique references are used to identify unique parts.

The transducer **12*aa* is generally representative of the transducers within the array 41. It has a pair of radially pattern, interdigitated, ring-shaped electrodes 21 and 22, so it may launch an acoustic beam 33*a* into a liquid filled reservior 13*a* and bring the beam 33*a* to a focus approximately at the surface 17 of the reservior 13*a* as described hereinabove. Additionally, the transducer 12*aa* has interdigitated outrigger electrodes 43, 44 and 45, 46, which are deposited on the surface 26*a* of the piezoelectric substrate 27*a* concentrically with the electrodes 21 and 22 and radially outwardly therefrom. The outrigger electrodes 43, 44 and 45, 46 are electrically independent of the electrodes 21 and 22**, but they may be fabricated concurrently therewith using the same metallization patterning process.

To steer the acoustic beam **33*a* in a plane parallel to the surface 17 of the reservior 13*a* (i.e., a plane parallel to the recording medium 16), the outrigger electrodes 43, 44 and 45, 46 are of relatively short arc length, so that they cause circumferentially asymmetrical Rayleigh waves to propogate along the surface 26a when they are energized. The electrodes 21 and 22 and the outrigger electrodes 43, 44 and 45, 46** may be coherently or incoherently driven. However, if they are coherently driven, it is important that they be suitably phase synchronized to avoid destructive interference among the Rayleigh waves they generate.

As will be appreciated, the circumferentially asymmetrical Rayleigh waves that are produced by energizing the outrigger electrodes 43, 44 and/or 45, 46 cause asymmetrical acoustic waves to leak into the liquid 32, thereby causing the focused beam 33a to shift parallel to the surface 17 of the reservior 13a until it reaches an acoustic equilibrium. Ideally, the outrigger electrodes 43, 44 and 45, 46 are electrically independent of one another and are positioned orthogonally with respect to one another, thereby permitting the beam 33a to be orthogonally steered for dot matrix ink jet printing and similar applications.

Figure 5:
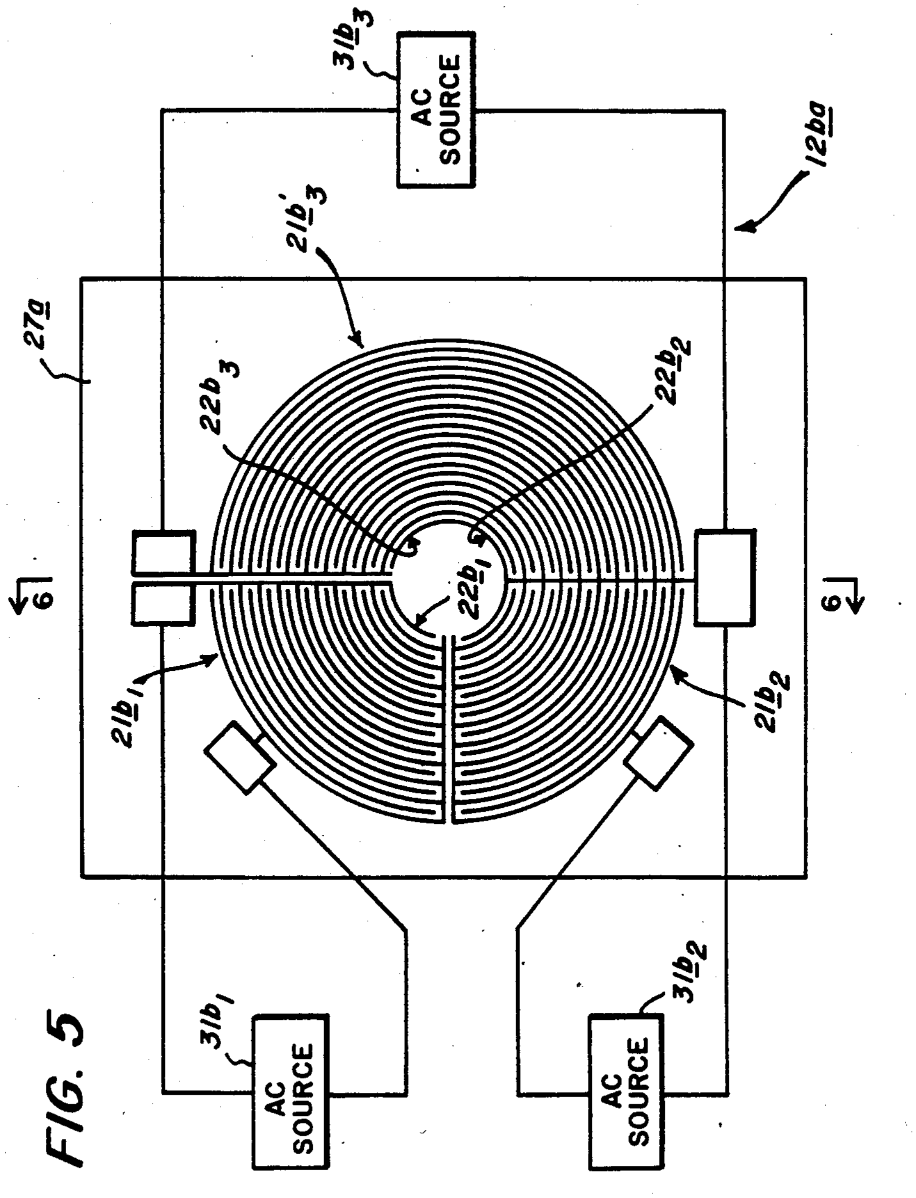
FIG. 5 is a plan view of a surface acoustic wave transducer having circumferentially segmented, ring-like interdigitated electrodes for beam steering.
Figure 6:
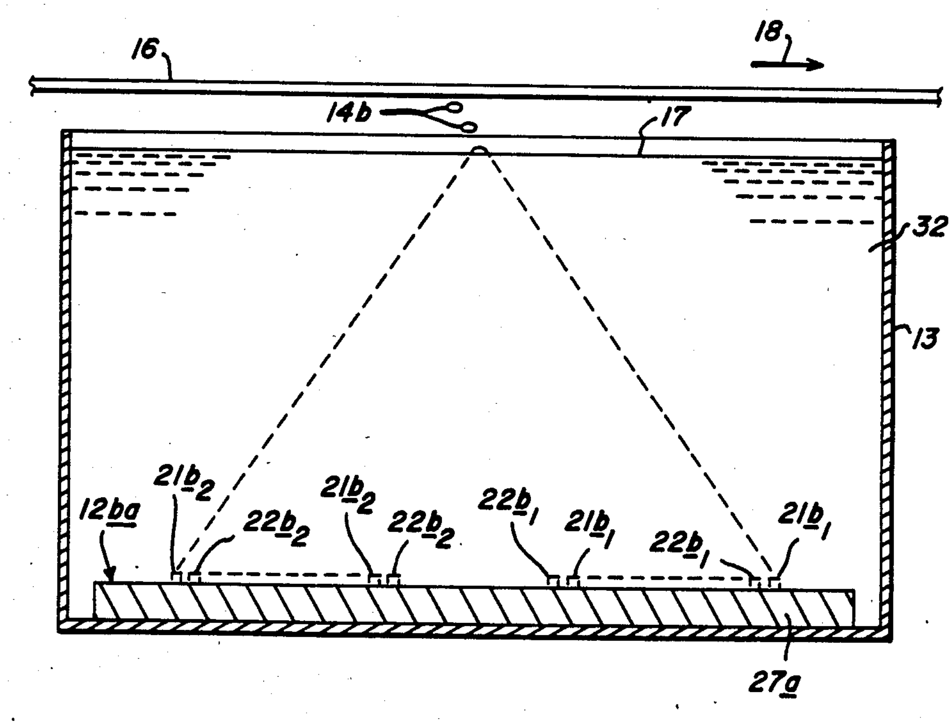
FIG. 6 is a sectional elevational view taken along the line 6—6 in FIG. 5 to illustrate the alternative beam steering mechanism in further detail.

Turning to FIGS. 5 and 6, differential phase and/or amplitude excitation of an electrically segmented surface acoustic wave transducer 12ba also may be employed for beam steering purposes. To that end, the transducer 12ba has a ring-like interdigitated electrode structure which is circumferentially segmented to form a plurality of electrically independent sets of electrodes $21b_1$, $22b_1$; $21b_2$, $22b_2$; and $21b_3$, $22b_3$. Three sets of electrodes are shown, two of which ($21b_1$, $22b_1$ and $21b_2$, $22b_2$) span arcs of approximately 90° each and the third of which ($21b_3$ and $22b_3$) spans an arc of approximately 180°, but it will be understood that the number of independent electrode sets and the arc spanned by each of them may be selected as required to best accommodate a given application of beam steering function. Separate sources $31b_1$, $31b_2$ and $31b_3$ are provided for exciting the electrode sets $21b_1$, $22b_1$; $21b_2$, $22b_2$; and $22b_3$, $22b_3$, respectively.

Unidirectional steering of the acoustic beam 33 is achieved by adjusting the relative amplitudes of the ac. drive voltages applied across the electrodes $21b_1$, $22b_1$; $21b_2$, $22b_2$; and $21b_3$, $22b_3$, while bidirectional steering is achieved by adjusting the relative phases of those voltages. The axes about which such steering occurs are orthogonal to one another in the illustrated embodiment, so there is a full 360° control over the direction in which the droplet 14b is ejected from the reservior. As will be understood, a linear or areal array of transducers 12ba may be employed to form an array of droplet ejectors (see FIG. 3), preferably on a common piezoelectric substrate 27a.

CONCLUSION

In view of the foregoing, it will be understood that the present invention provides relatively inexpensive and reliable nozzleless liquid droplet ejectors, which may be appropriately configured for a wide variety of applications.

What is claimed is:

1. A nozzleless droplet ejector for ejecting droplets of liquid from a surface of a liquid filled reservoir, said ejector comprising a planar surface acoustic wave transducer which is submerged at a predetermined depth in said reservoir;

drive means coupled to said transducer for energizing said transducer to launch a cone of acoustic waves into said liquid at an angle selected to cause said acoustic waves to come to a focus of predetermined waist diameter approximately at the surface of said reservoir, whereby said focused acoustic waves impinge upon and acoustically excite liquid near the surface of said reservoir to an elevated energy level within a limited area determined by said waist diameter;

said focused acoustic waves having an intensity selected to cause said elevated energy level to be an incipient energy level for droplet formation; and external means for coupling additional energy into the acoustically excited liquid for extracting droplets from said reservoir on demand.

2. The droplet ejector of claim 1 wherein said transducer comprises a generally planar piezoelectric substrate, and a pair of multi-element, ring-like, interdigitated electrodes concentrically deposited on said substrate.

3. The droplet ejector of claim 2 wherein said electrods are a photolithographically patterned metalization deposited on said substrate.

4. A nozzleless droplet ejector for ejecting droplets of liquid from a surface of a liquid filled reservoir, said ejector comprising a planar surface acoustic wave transducer which is submerged at a predetermined depth in said reservoir;

drive means coupled to said transducer for energizing said transducer to launch a cone of acoustic waves into said liquid at an angle selected to cause said acoustic waves to come to a focus of predetermined waist diameter approximately at the surface of said reservoir, whereby said focused acoustic waves impinge upon and acoustically excite liquid near the surface of said reservoir to an elevated energy level within a limited area determined by said waist diameter thereby enabling liquid droplets of predetermined diameter to be propelled from said reservoir on demand, and means for coupling asymmetrical acoustical energy into said reservoir for steering said focused acoustic waves in a plane generally parallel to the surface of said reservoir.

5. The droplet ejector of claim 4 wherein said transducer comprises a generally planar piezoelectric substrate, and a pair of multi-element, ring-like, interdigitated electrodes concentrically deposited on said substrate.

6. The droplet ejector of claim 5 wherein said means includes at least one electrically independent set of interdigitated outrigger electrodes deposited on said substrate radially outwardly from said ring-like electrodes for launching asymmetric acoustic waves into said liquid for steering said focused acoustic waves.

7. The droplet ejector of claim 6 wherein said substrate has a patterned metallization deposited thereon to define said ring-like electrodes and said outrigger electrodes.

8. The droplet ejector of claim 5 wherein said means includes two electrically independent sets of said outrigger electrodes which are orthogonally positioned with respect to one another on said substrate for orthogonally launching asymmetrical acoustic waves into said liquid for orthogonally steering said focused acoustic waves.

9. The droplet ejector of claim 5 wherein said ring-like, interdigitated electrodes are circumferentially segmented, and said means comprises means for differentially exciting said segmented electrodes.

10. An array of nozzleless droplet ejectors for ejecting droplets of liquid from a liquid filled reservoir, said array comprising a generally planar piezoelectric substrate submerged at a predetermined depth in said reservoir, plural pairs of ring-like, multi-element, interdigitated electrodes deposited on said substrate on laterally displaced centers, whereby said electrode pairs and said substrate define a plurality of substantially independent surface acoustic wave transducers, and drive means coupled across said electrode pairs for exciting said transducers for launching respective acoustic beams into said liquid at an angle selected to cause each of said acoustic beams to come to focus approximately at the surface of said reservoir, with said focused acoustic beams being laterally displaced from each other.

11. The droplet ejector array of claim 10 wherein said drive means causes said transducers to launch intensity modulated acoustic waves into said liquid for propelling liquid droplets from said reservoir at selected lateral locations on demand.

12. The droplet ejector array of claim 10 wherein means for selectively and individually defocusing said acoustic beams, thereby inhibiting droplets from being propelled from said reservoir at selected lateral locations.

13. The droplet ejector array of claim 10 wherein said focused acoustic beams have a substantially uniform, constant intensity which is selected to acoustically excite the liquid upon which they impinge to an incipient energy level for droplet formation.

external means are provided for coupling additional energy into the acoustically excited liquid at selected lateral locations to extract droplets from said reservoir on demand.

14. The droplet ejector array of claim 10 wherein said electrodes are defined by a patterned metalization deposited on said substrate.

15. The droplet ejector array of claim 10 wherein each of said transducers further includes means for launching asymmetric acoustic waves into said liquid for steering the acoustic beam generated by the transducer in a direction generally parallel to the surface of said reservoir.

16. The droplet ejector array of claim 15 wherein said means includes at least one electrically independent set of interdigitated outrigger electrodes deposited on said substrate radially outwardly from the ring-like electrodes of the transducer for launching said asymmetric acoustic waves into said liquid.

17. The droplet ejector array of claim 16 wherein said means includes two electrically independent sets of said outrigger electrodes which are orthogonally positioned with respect to one another on said substrate for orthogonally launching asymmetrical acoustic waves into said liquid.

18. The droplet ejector of claim 16 wherein said transducers have a common piezoelectric substrate, and said piezoelectric has a patterned metallization deposited thereon to define the ring-like electrodes and the outrigger electrodes of said transducers.

19. The droplet ejector array of claim 16 wherein the ring-like, interdigitated electrodes of each of said transducers are circumferentially segmented, whereby the focused acoustic beam generated by each of the transducers may be acoustically steered by differentially exciting said segmented electrodes.

* * * * *